United States Patent
Smed

(10) Patent No.: US 10,617,201 B2
(45) Date of Patent: Apr. 14, 2020

(54) SYSTEM FOR REDUCING INJURY FROM PINCH ZONES IN ADJUSTABLE HEIGHT WORK SURFACE ASSEMBLIES

(71) Applicant: Ole Falk Smed, Calgary (CA)

(72) Inventor: Ole Falk Smed, Calgary (CA)

( * ) Notice: Subject to any disclaimer, the term of this patent is extended or adjusted under 35 U.S.C. 154(b) by 0 days.

(21) Appl. No.: 16/148,869

(22) Filed: Oct. 1, 2018

(65) Prior Publication Data
US 2019/0098994 A1    Apr. 4, 2019

Related U.S. Application Data

(60) Provisional application No. 62/566,913, filed on Oct. 2, 2017.

(51) Int. Cl.
*A47B 21/02*     (2006.01)
*A47B 9/00*      (2006.01)
*G05B 19/416*    (2006.01)

(52) U.S. Cl.
CPC ........... *A47B 21/02* (2013.01); *A47B 9/00* (2013.01); *G05B 19/416* (2013.01); *A47B 2200/0056* (2013.01); *A47B 2200/0062* (2013.01); *G05B 2219/50378* (2013.01)

(58) Field of Classification Search
CPC ... A47B 21/07; A47B 9/00; A47B 2200/0056; A47B 2200/0062; A47B 21/02
USPC .................................. 108/147, 50.01, 50.02
See application file for complete search history.

(56) References Cited

U.S. PATENT DOCUMENTS

| | | | | |
|---|---|---|---|---|
| 6,296,408 | B1 * | 10/2001 | Larkin | A47B 83/001 400/681 |
| 7,620,667 | B2 * | 11/2009 | Rollin | H04L 67/34 |
| 10,085,562 | B1 * | 10/2018 | Labrosse | A47C 1/0242 |
| 10,159,336 | B2 * | 12/2018 | Liao | A47B 9/16 |
| 10,206,498 | B1 * | 2/2019 | Labrosse | A47B 21/02 |
| 10,376,158 | B2 * | 8/2019 | Desroches | A61B 5/01 |
| 2008/0245279 | A1 * | 10/2008 | Pan | A47B 9/00 108/144.11 |
| 2009/0133609 | A1 * | 5/2009 | Nethken | A47B 21/02 108/50.02 |
| 2012/0031310 | A1 * | 2/2012 | Jedrysik | A47B 21/0314 108/50.01 |
| 2013/0293173 | A1 * | 11/2013 | Strothmann | A47B 9/20 318/466 |
| 2014/0103174 | A1 * | 4/2014 | Koder | A47B 9/04 248/188.5 |

(Continued)

*Primary Examiner* — Jose V Chen
(74) *Attorney, Agent, or Firm* — Carl A. Hjort, III

(57) ABSTRACT

Embodiments of a system for reducing injury from pinch zones in adjustable-height work surface assemblies are shown, the system including a desk surface; one or more adjustable-height legs, a controller for the adjustable-height legs; a Hall-effect sensor providing a signal to the system corresponding to a current draw of a motor in the adjustable height leg and wherein the system disables the motor if the current draw of the motor exceeds a fixed set point; and a proximity detection sensor being a strip of conducting material disposed adjacent to a perimeter of the desk surface and in electrical connection with an LC tank circuit, wherein the LC tank circuit is configured to exhibit a change in state when an object is in close proximity to the strip of conducting material and wherein the system disables the motor when the LC tank circuit exhibits the change in state.

20 Claims, 27 Drawing Sheets

(56) References Cited

U.S. PATENT DOCUMENTS

| | | | |
|---|---|---|---|
| 2014/0152068 A1* | 6/2014 | Hille | A47C 20/041 297/362.11 |
| 2014/0285959 A1* | 9/2014 | Riley | A47B 21/0073 361/679.08 |
| 2015/0285430 A1* | 10/2015 | Wang | A47B 9/04 248/188.5 |
| 2016/0051042 A1* | 2/2016 | Koch | A47B 9/00 248/550 |
| 2016/0170402 A1* | 6/2016 | Lindstrom | A47B 9/00 700/275 |
| 2016/0255950 A1* | 9/2016 | Mata Valdes | A47B 9/10 |
| 2016/0309889 A1* | 10/2016 | Lin | A47B 9/00 |
| 2016/0360879 A1* | 12/2016 | Kelley | A47B 21/06 |
| 2017/0099943 A1* | 4/2017 | Joshi | B60B 33/021 |
| 2017/0135636 A1* | 5/2017 | Park | A61B 5/0205 |
| 2017/0224101 A1* | 8/2017 | Bruder | A47B 9/04 |
| 2017/0303679 A1* | 10/2017 | Tseng | A47B 9/04 |
| 2017/0354244 A1* | 12/2017 | Lee | A47B 9/20 |
| 2017/0360190 A1* | 12/2017 | Chen | A47B 9/20 |
| 2018/0120790 A1* | 5/2018 | Hansen | G05B 19/0423 |
| 2018/0172062 A1* | 6/2018 | Hu | A47B 9/04 |
| 2018/0184799 A1* | 7/2018 | Lin | A47B 17/02 |
| 2018/0184800 A1* | 7/2018 | Yamamoto | A47B 9/20 |
| 2018/0279770 A1* | 10/2018 | Crowe | A47B 9/16 |
| 2018/0360208 A1* | 12/2018 | Liao | A47B 9/16 |
| 2019/0029412 A1* | 1/2019 | Gibson | A47B 9/00 |
| 2019/0059573 A1* | 2/2019 | Tseng | A47B 9/04 |
| 2019/0082823 A1* | 3/2019 | Applegate | A47B 3/08 |
| 2019/0298055 A1* | 10/2019 | Yamamoto | A47B 9/00 |

\* cited by examiner

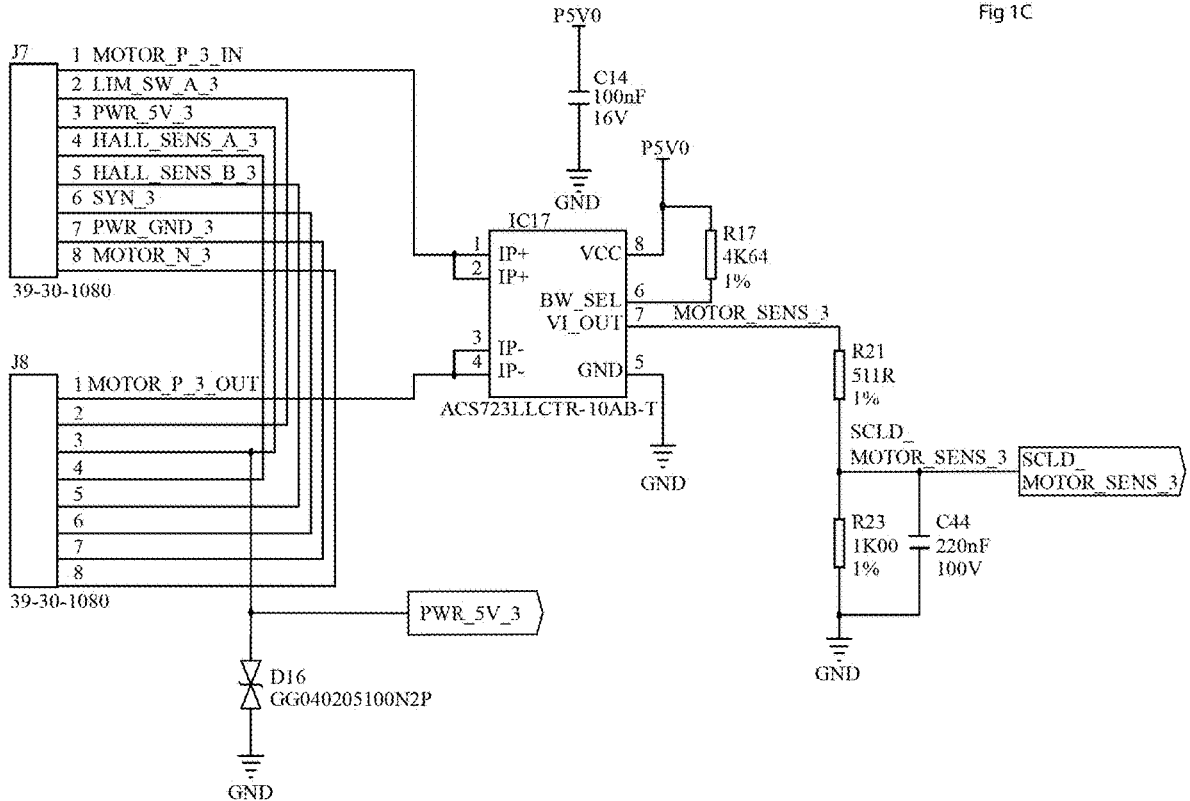

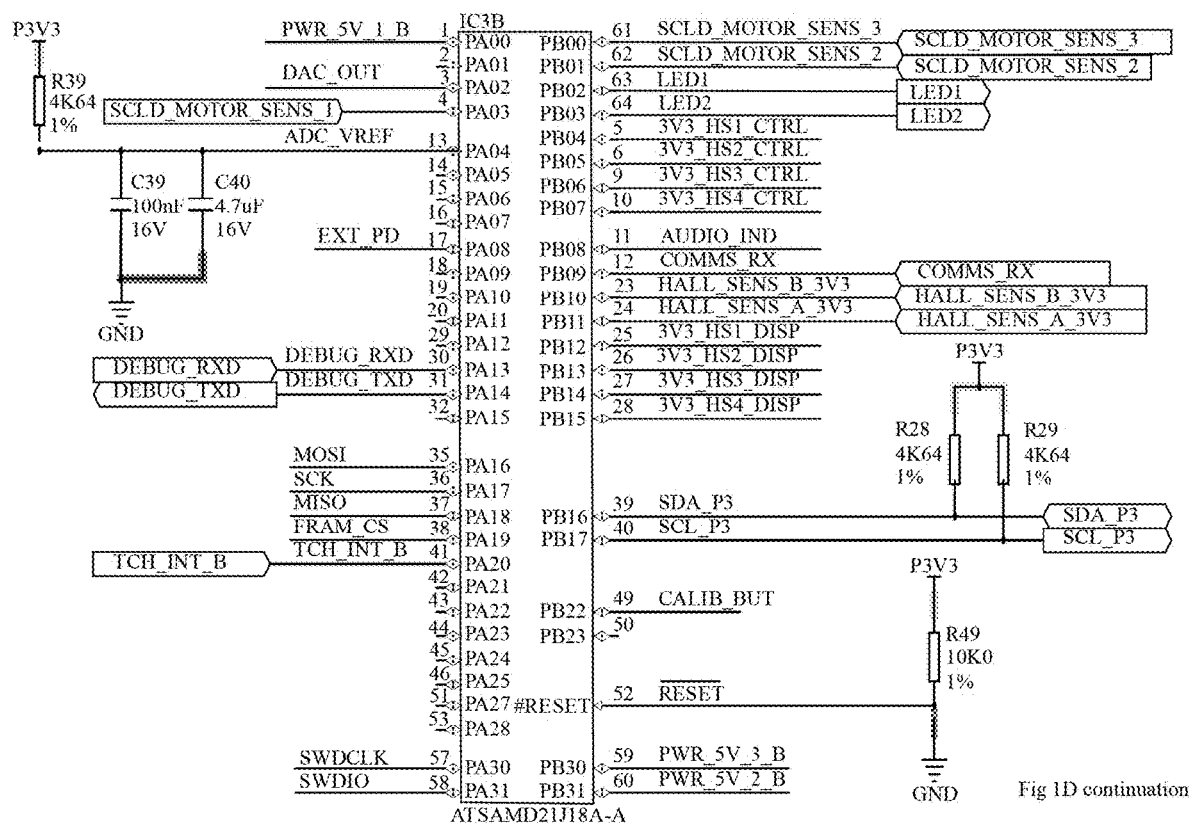
Fig 1D continuation

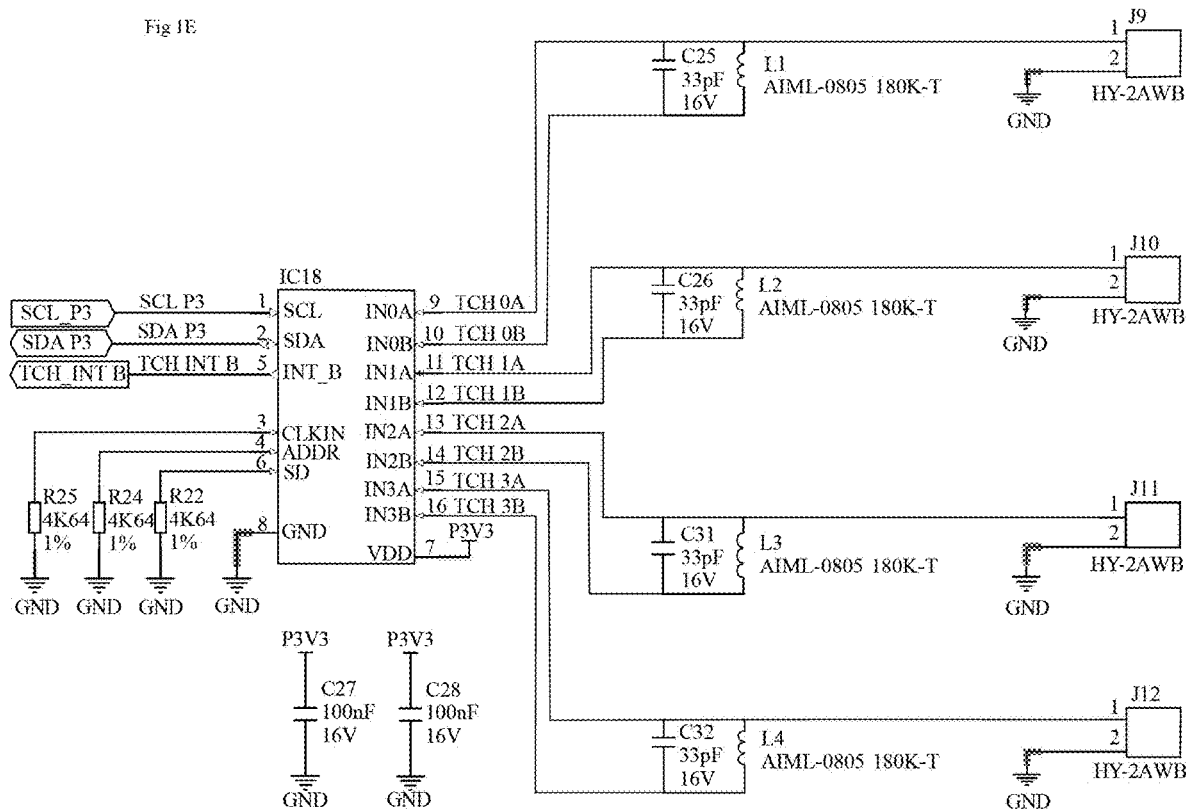

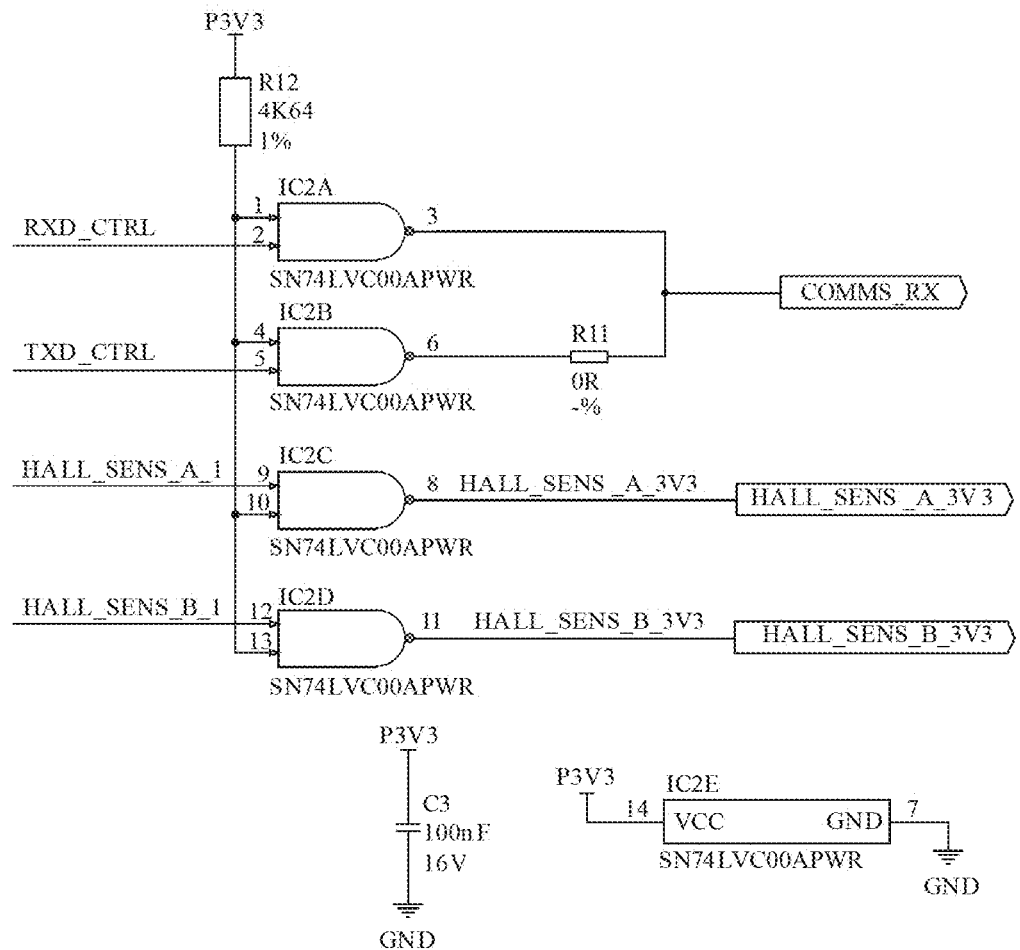

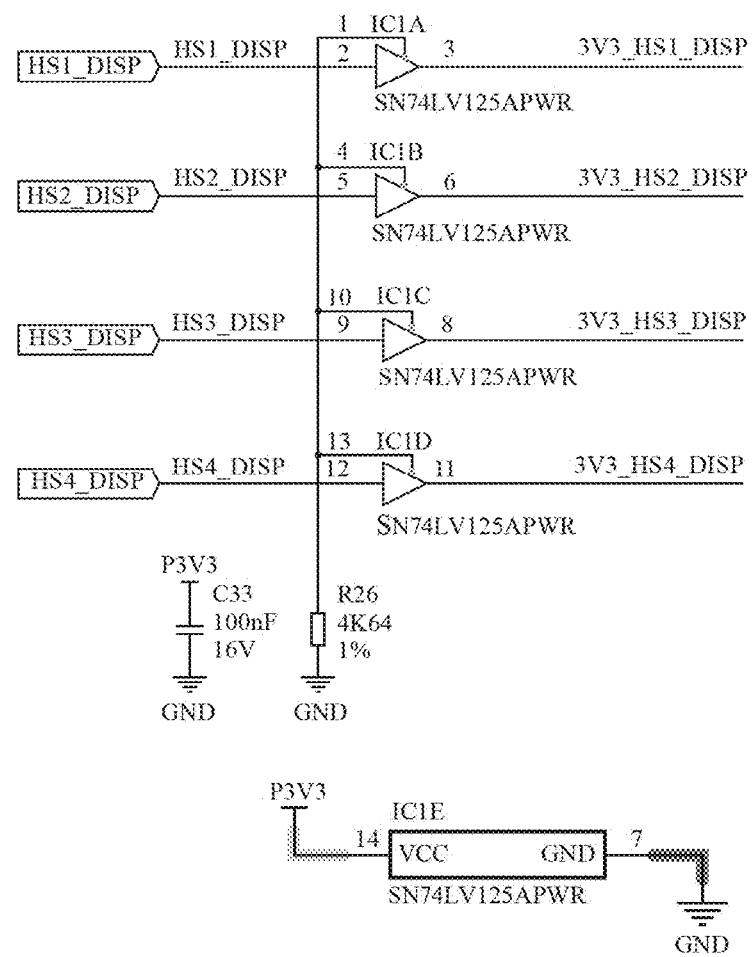

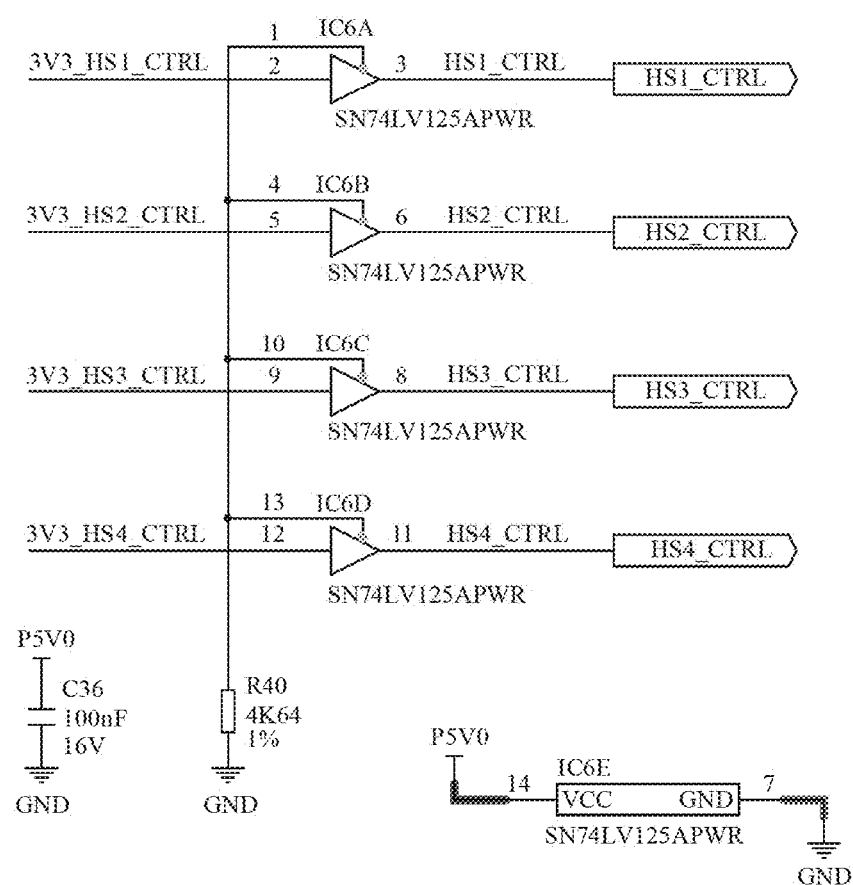

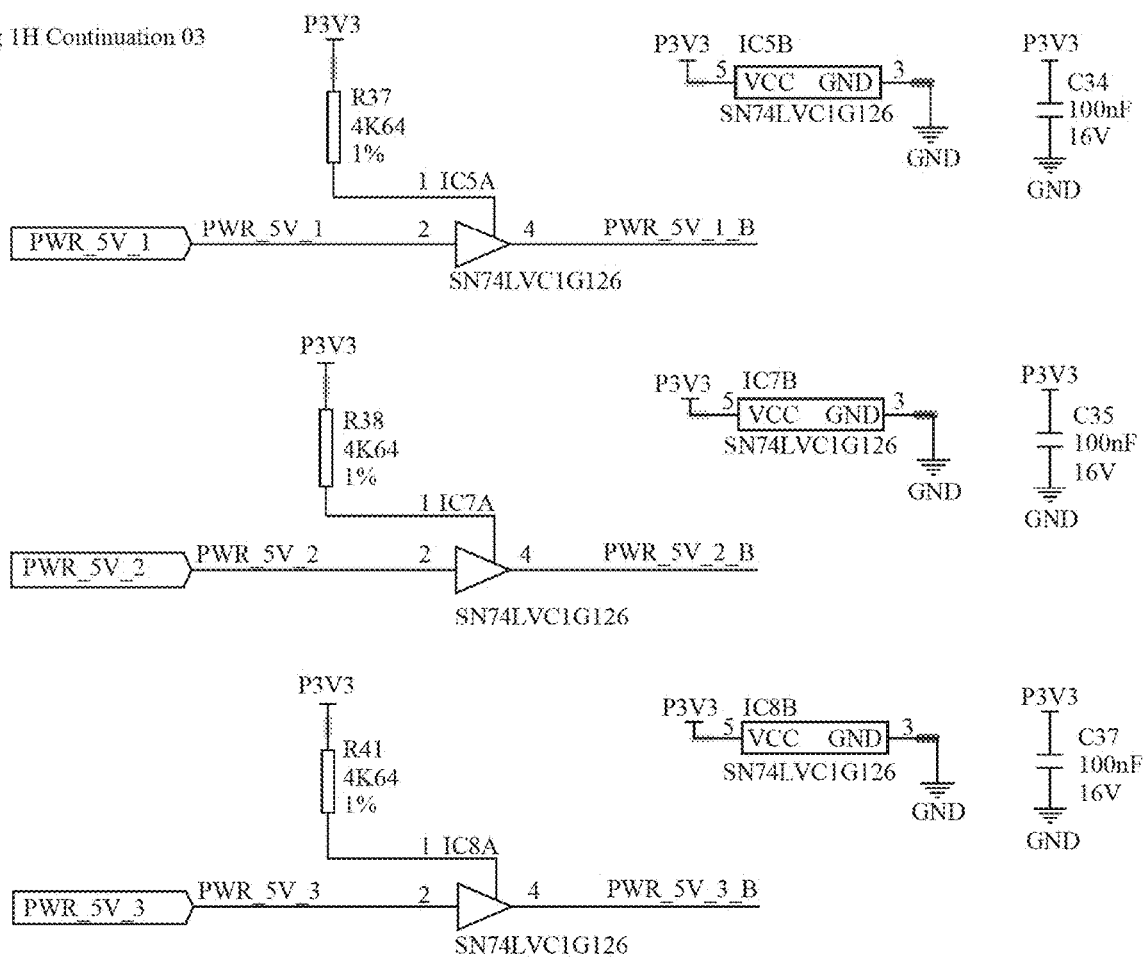

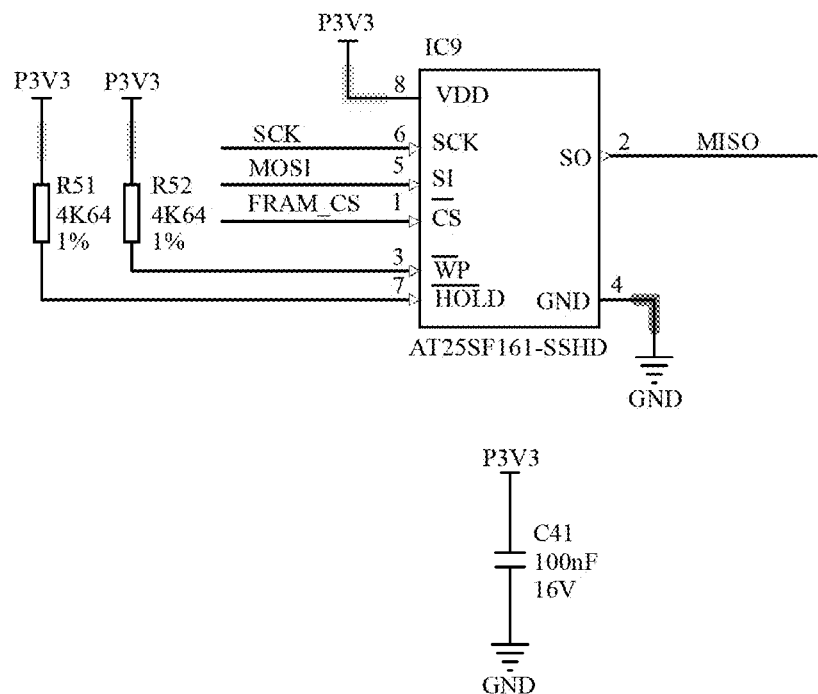

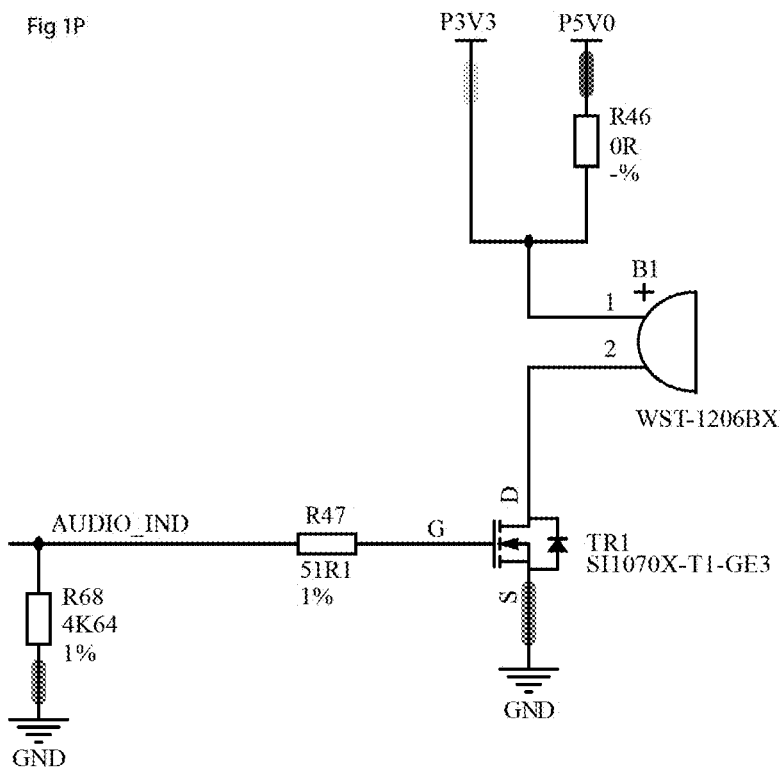

Section 01    Section 02

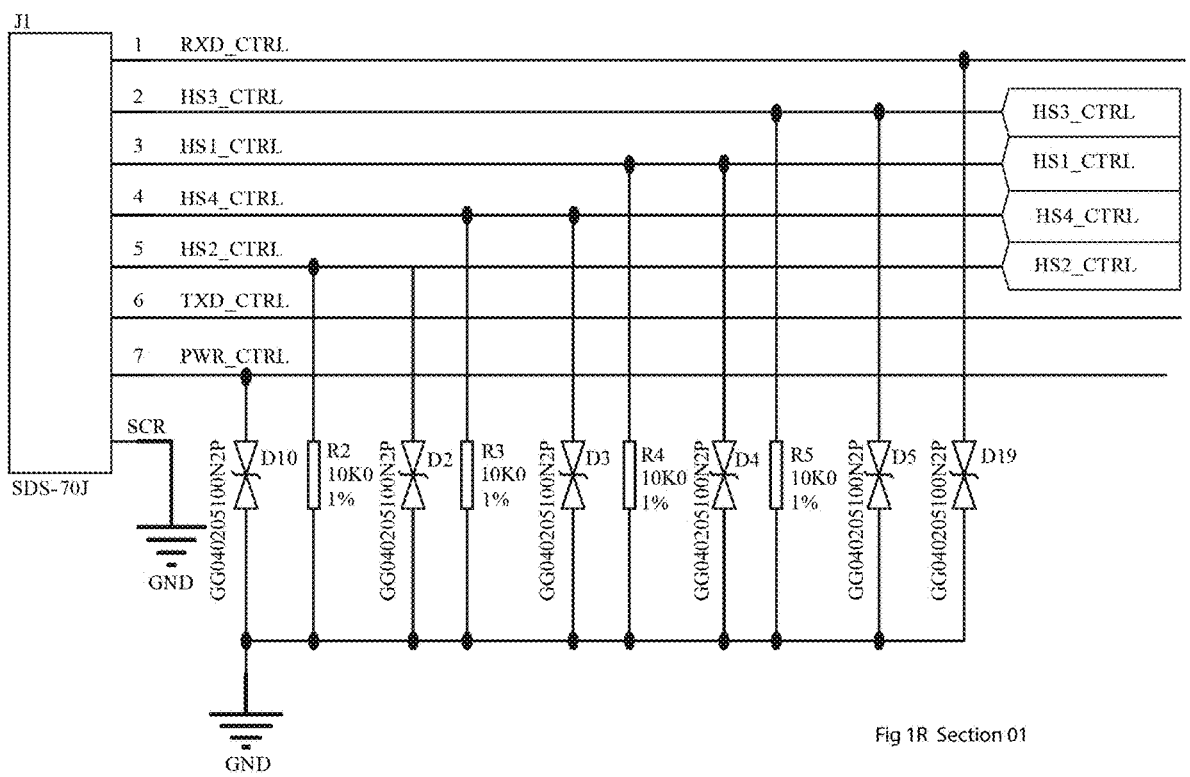
Fig 1R Section 01

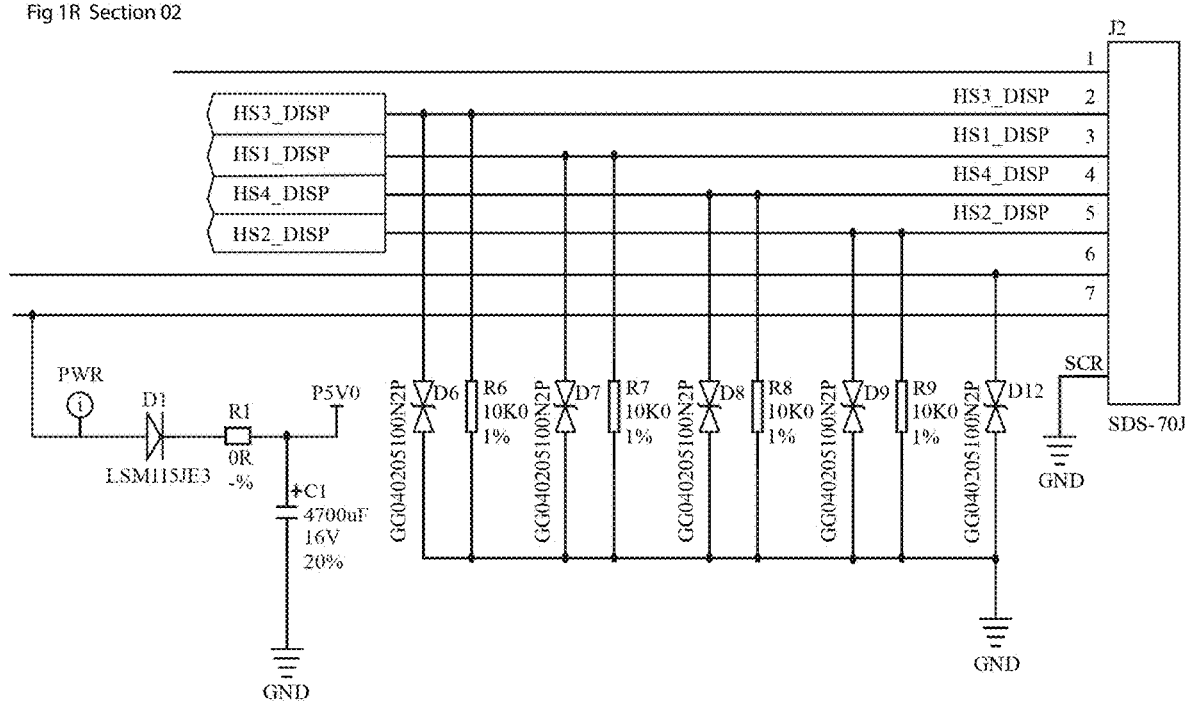

SYSTEM FOR REDUCING INJURY FROM PINCH ZONES IN ADJUSTABLE HEIGHT WORK SURFACE ASSEMBLIES

CROSS-REFERENCE TO RELATED APPLICATIONS

The present application claims the benefits of U.S. Provisional Application Ser. No. 62/566,913, filed Oct. 2, 2017, entitled "System and Method for Reducing Injury from Pinch Zones in Adjustable Height Work Surface Assemblies" and which is incorporated herein by this reference in its entirety.

DETAILED DESCRIPTION OF THE DRAWINGS

Embodiments of a system for reducing injury in pinch zones in adjustable height work surface assemblies are shown and described. The system includes a desk surface; at least one adjustable-height leg, said adjustable height leg having an outer shell, a top casting for engagement with the desk surface and an actuator with a motor disposed within the outer shell for adjusting the height of the leg; a controller for the at least one adjustable-height leg, said controller having a system for preventing pinch injuries during the operation of the adjustable height leg, said system comprising: a Hall-effect sensor in electrical connection with an electrical input terminal of the motor, said Hall-effect sensor providing a signal to the system corresponding to a current draw of the motor and wherein the system is configured to disable the motor if the current draw of the motor exceeds a fixed set point; and a proximity detection sensor connected to the system, wherein said proximity detection sensor is a strip of conducting material disposed adjacent to a perimeter of the desk surface and in electrical connection with an LC tank circuit, wherein said LC tank circuit is configured to exhibit a change in state when an object is in close proximity to the strip of conducting material and wherein the system is configured to disable the motor when the LC tank circuit exhibits the change in state. It should be appreciated that while one aspect of the system is to prevent fingers, hands, limbs, etc. from being pinched during the movement of a height-adjustable desktop, when such fingers, hands, limbs, etc. are caught between the moving desktop and some fixed object, a further aspect of the system is to prevent damage to the height adjustable desk and surrounding items by preventing movement of the desktop when furniture or other immovable items are in its path of travel.

Figure 6:
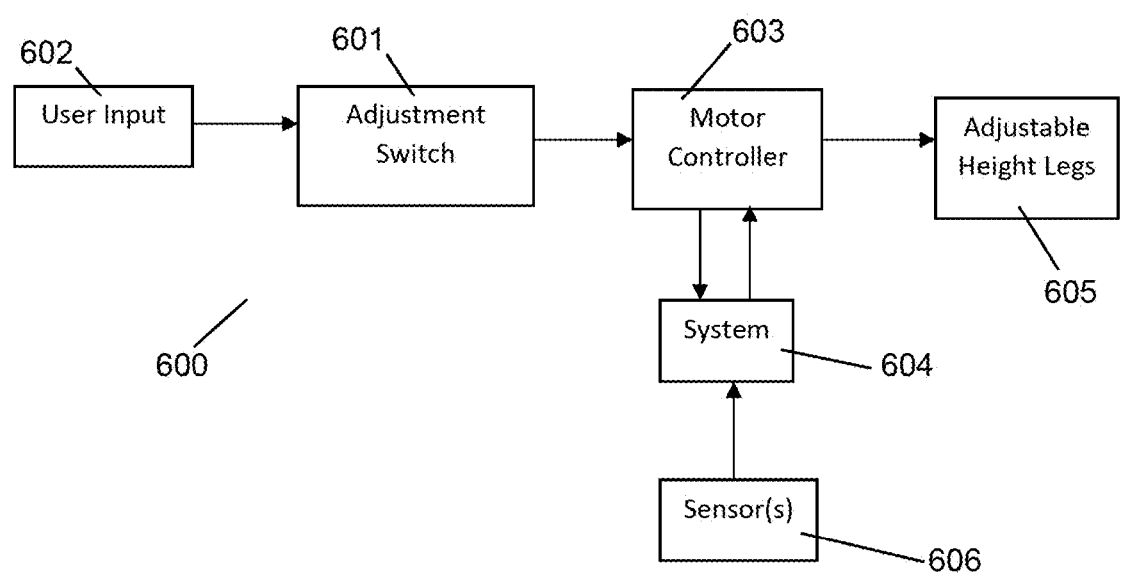
FIG. 6 is a block diagram of the system for reducing injury from pinch zones in adjustable height work surface assemblies, in addition to the other components in a height-adjustable desk.

Reference is initially made to FIG. 6, which is a block diagram of the system for reducing injury from pinch zones in adjustable height work surface assemblies, in addition to the other components in a height-adjustable desk. The entire assembly 600 of a height-adjustable desk equipped with the present system includes an adjustment switch 601. Adjustment switch 601 receives a user input 602, which takes the form of an input to either raise or lower the height of the height adjustable desktop. Electrical signals, indicating either raising or lowering the desk are sent from the adjustment switch 601 to the motor controller 603. The motor controller 603 communicates with the present system 604. As will be described in greater detail below, the system 604 determines whether there is a collision, meaning that the height adjustable desktop has contacted an obstruction, or the proximity of an obstruction has been detected. In either case, the system 604 will interrupt the motor controller's 603 signal to operate the height adjustable legs 605, notwithstanding the user input 602. Part of this determination by the system 604 is based on the input of sensors 606 into the system 604. If there is no collision or the proximity of an obstruction detected, the motor controller 603 operates the height adjustable legs 605 either up or down depending on the user input 602.

Figure 1A:
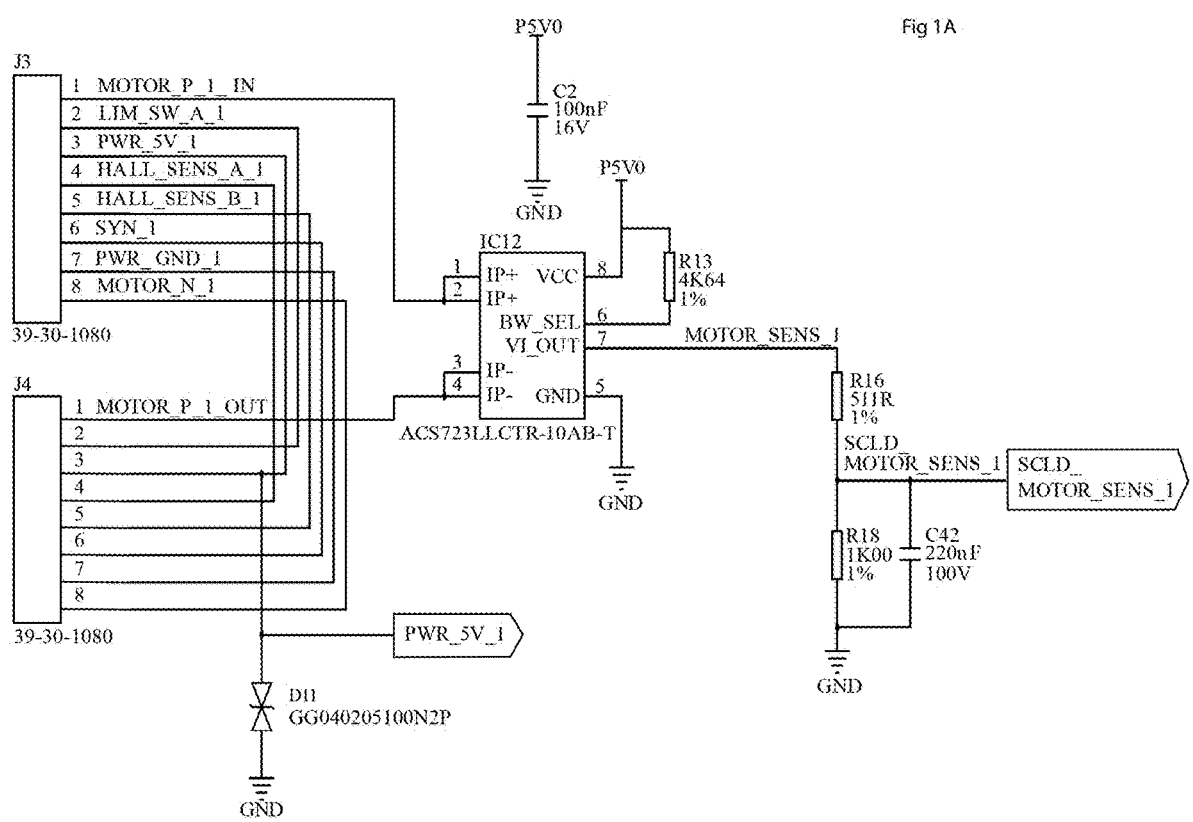
FIGS. 1A-R show a detailed circuit diagram of the system for reducing injury from pinch zones in adjustable height work surface assemblies. The letters "I," "O," and "Q" have been deliberately omitted to avoid confusion in the identification of the drawings.
Figure 1B:
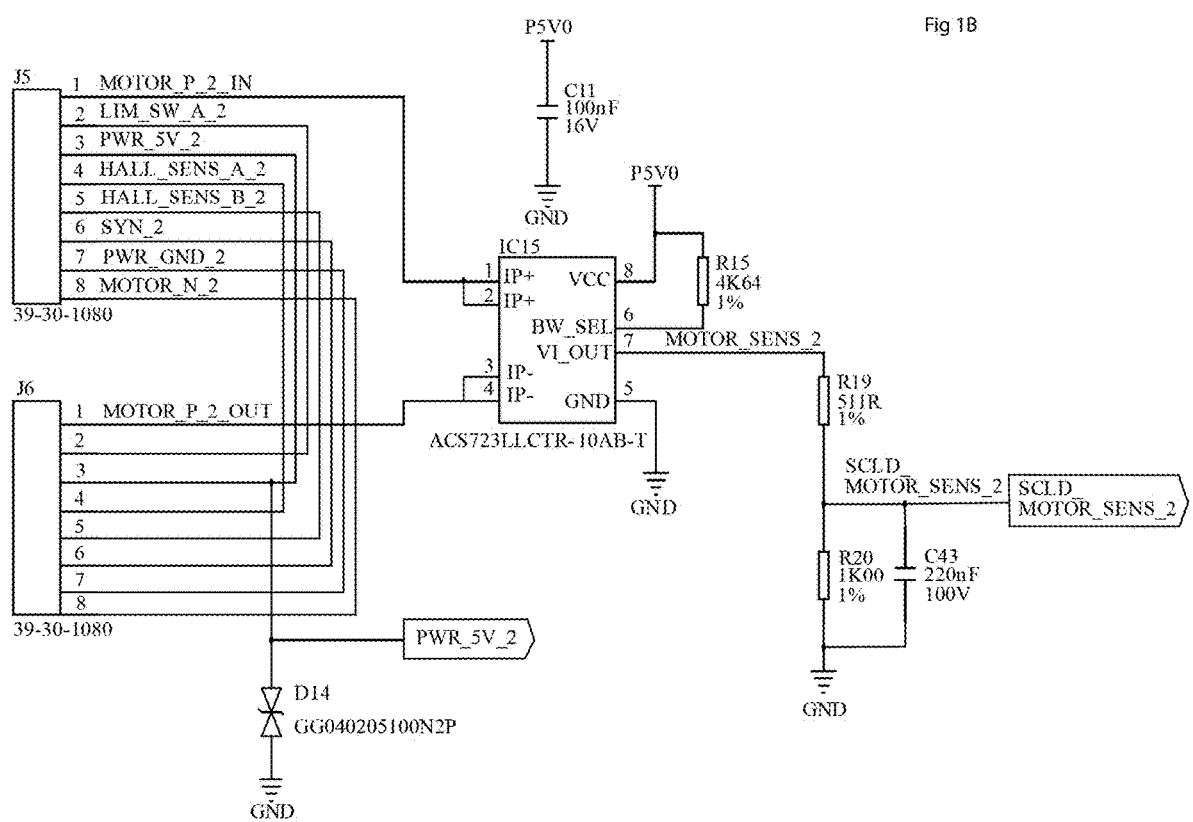
Figure 1D:
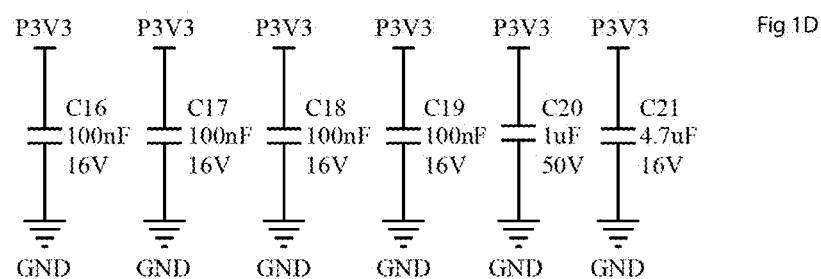
Figure 1D:
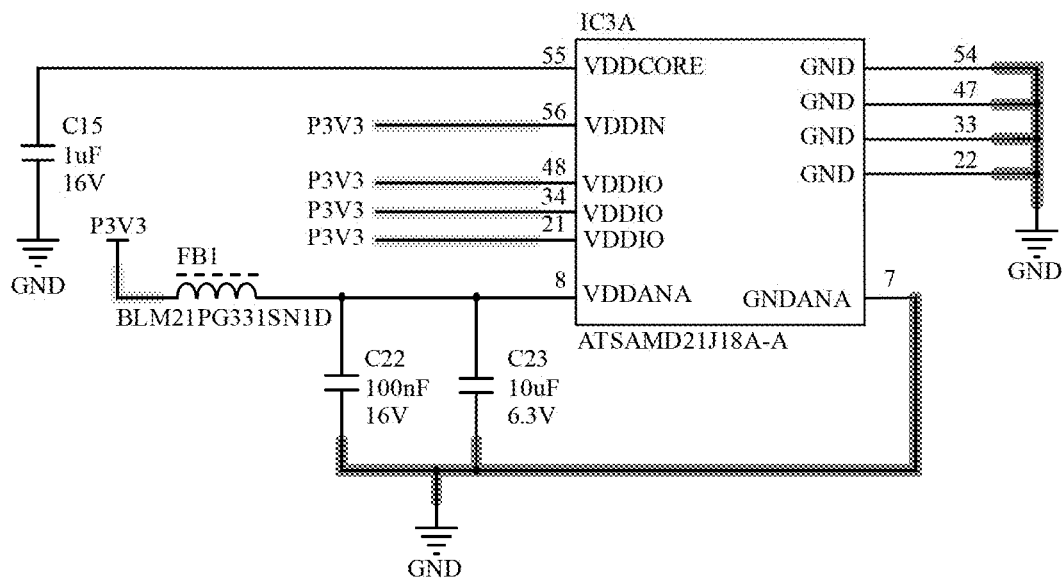
Figure 1F:
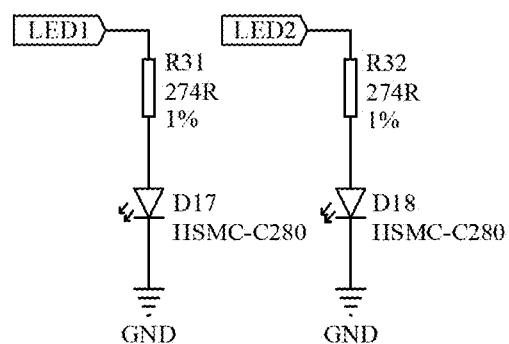
Figure 1G:
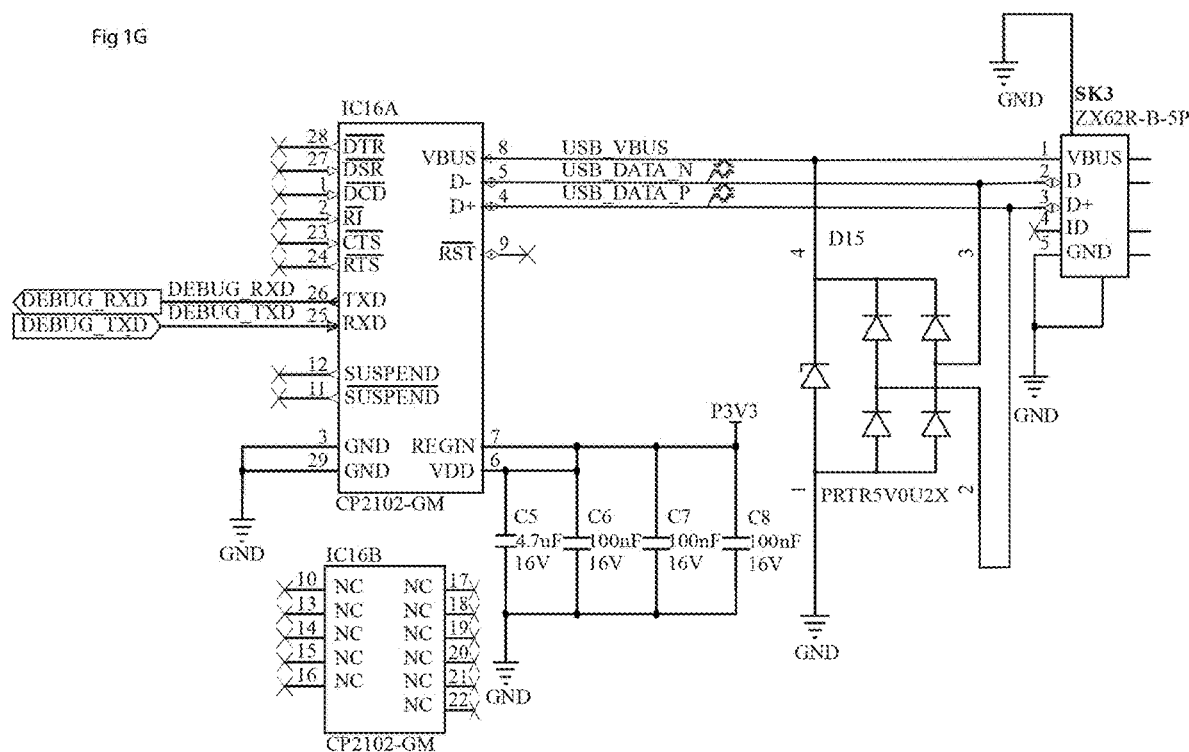
Figure 1J:
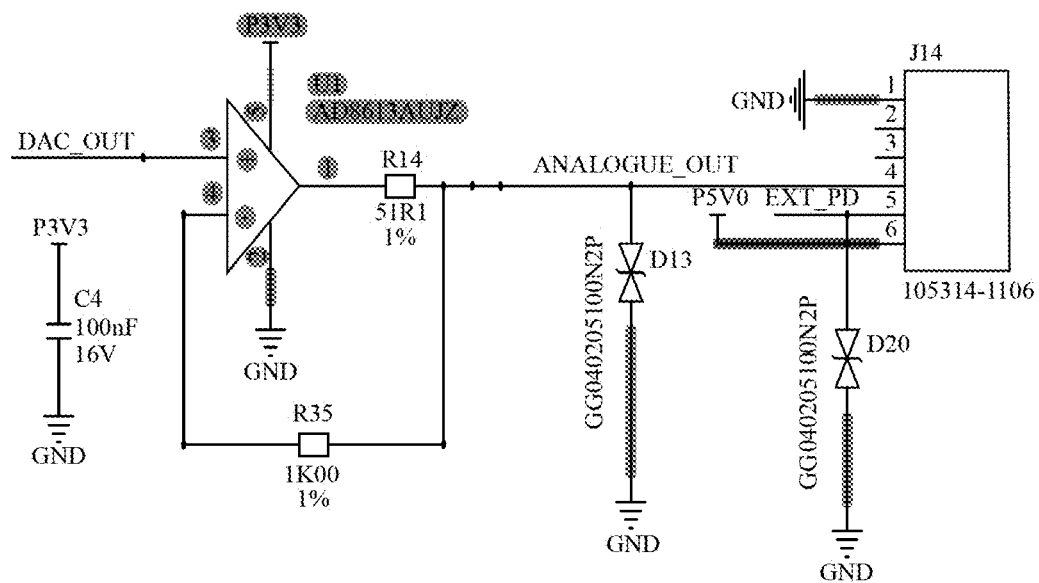
Figure 1L:
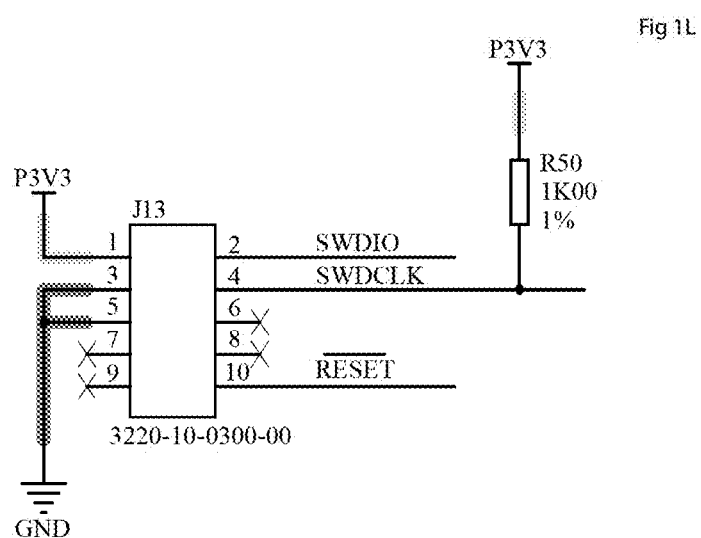
Figure 1M:
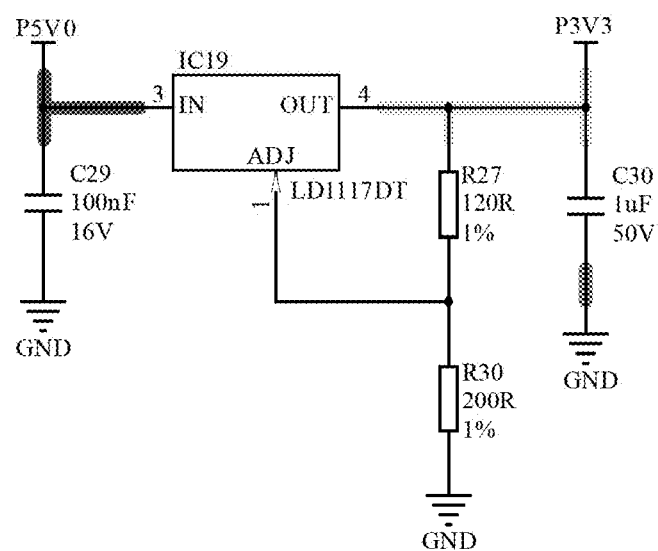
Figure 1N:
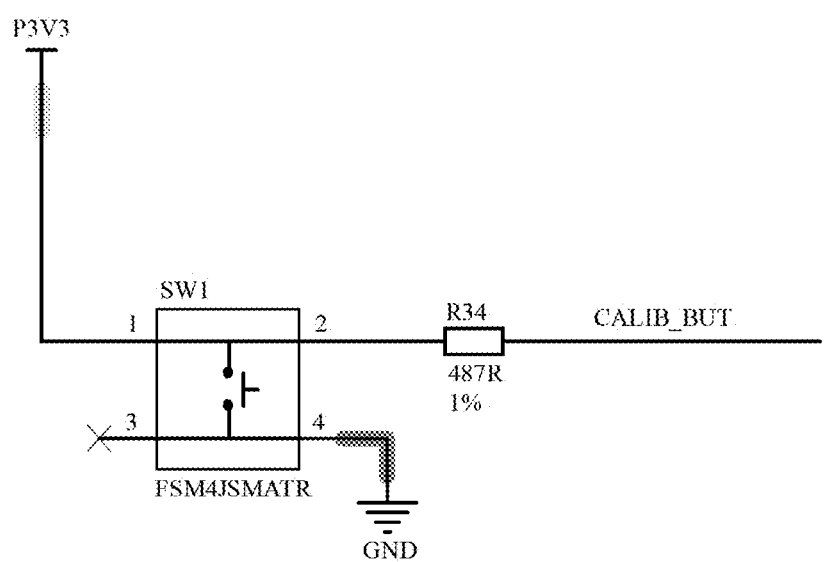
Figure 1R:
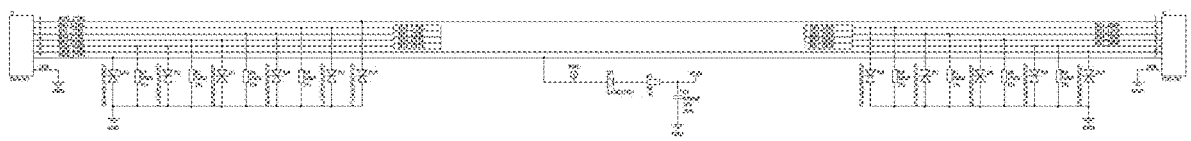

FIGS. 1A-1R show a detailed circuit diagram for the system for reducing injury from pinch zones in adjustable height work surface assemblies. FIGS. 1A, 1B and 1C show circuit components that monitor current loads on each of the three motors that, in conjunction with the actuators, allow for the vertical movement of the adjustable height leas. It should be appreciated that the number of current load monitors corresponds to the number of adjustable height legs, and by extension, therefore the number of motors in the assembly, each adjustable height leg operated by its own motor. In this example, three (3) legs are used, however assemblies having one (1), two (2) legs or assemblies having four (4) or more legs are also possible and fall within the scope of this disclosure. The motors operate at a fixed speed, therefore, if the load remains constant on the desktop then the motor current will remain the same. If a collision occurs, then the controller will attempt to keep the motor speed the same by modulating each motor's current individually. The collision detection system continually monitors the current of each of the three motors, and is constantly looking for a change in the current demand over the measured average.

As can be seen in FIGS. 1A, 1B and 1C the current draw of each of the three motors is measured using a Hall-effect current sensor fitted in-line with the motor +VE terminal. The Hall current sensor converts the measured current into a voltage which is linearly proportional to the measured current. This voltage is then converted at a regular 10 ms sampling interval using a 10-bit analogue-to-digital converter. The motor current sense signals are sent to the microcontroller shown in FIG. 1D. The microcontroller performs the following software-defined functions. The digitally measured instantaneous current draw is fed into an Infinite Impulse Response low pass filter, which gives a short-term average current consumption from the motor. The output from the filter is compared with the previous sample to provide a differential current over time. The differential current is then fed into a windowed integrator which sums the current differential over a longer time-frame. The system disables the motor function if the output from the integrator rises above a fixed set point. Thus, this portion of the circuit detects collision of the moving desktop with obstructions by monitoring changes in motor current draw and disabling the motors when a collision is detected.

In addition to detecting interference in the movement of the desktop by detecting changes in motor current draw, the system also performs proximity detection based on a capacitance-to-frequency conversion. This proximity detection function allows for the motors in the legs to be disabled when an obstruction, e.g. a piece of furniture or a human limb is present near the edge of the height adjustable desk. The proximity detection is based on an LC tank resonator; which uses an inductor and capacitor sensor to create an oscillation running at a fixed frequency, as shown in FIG. 1E. FIG. 1E shows four LC tank resonator sensors, as would be applied to the four edges of a rectangular desk having height adjustable functionality. It should be appreciated that additional capacitive sensors may be fitted externally to the system via connectors, for instance in cases where the geometry of the desktop is such that more than four sensors are required to adequately surround the perimeter of the desktop. The sensor, which will be discussed in greater detail below, is designed such that its value changes with respect to the proximity of an external object with a greater capacitance than the sensor itself, such as a hand or other body part.

The proximity of anything with a large capacitance compared to the capacitive sensor will cause a change in the capacitance of the LC tank circuit. This in turn will cause the frequency of the tank resonator to drop, the closer the obstruction is to the sensing strip. The change in frequency is measured by IC18 in FIG. 1E, and the result is sent to the microcontroller in FIG. 1D.

The microcontroller in FIG. 1D performs the following software defined functions on the frequency change signal received from the LC tank circuit and IC18 in FIG. 1E. The incoming frequency measurement is fairly low noise, however, this signal can be affected by the proximity of external noise sources, such as computers and power supplies. Therefore, the input signal from the frequency converter is fed through a low pass filter. The absolute frequency of the sensor is not important since this will vary slightly over time due to temperature and humidity. The sensing system relies on being able to detect a short-term change in the frequency. In order to do this the sensor is sampled over a longer time period, and an average value is then calculated. Any deviation from this long term average is then used to cause the system to halt the operation of the motors. In this way the proximity of an obstruction, either furniture or a human limb or part thereof, which causes a frequency change in the LC tank circuit results in stopping of the motor to prevent collision of the moving desktop with said obstruction. Additionally, the LC tank circuit frequency will increase if the sensor is disconnected from the system. In the case of sensor disconnection or failure, the system also detects the accompanying change in frequency and halts the operation of the motors. This prevents the height adjustable desk from being operated if the system for preventing injury from pinch zones is inoperable.

The circuit components shown in FIG. 1F provide a visual status indication to the user, the indicators are controlled by the microcontroller shown in FIG. 1D. This visual status indicator, e.g. an indicator light, can warn the user that the system has detected a collision or that a collision may be imminent. In some embodiments of the system, the visual status indicator may provide warning to the user of a collision or imminent collision, and the system may not stop the motors, instead relying on the visual status indicator's warning to allow the user to decide whether to continue operating the height-adjustability function of the desk, and thereby manually over-riding the automatic stopping function of the system. The circuit components shown in FIG. 1G link the system for reducing injury from pinch zones in adjustable height work surface assemblies via USB to a host PC. The host PC can then be used to set-up the operating parameters, and retrieve operating data from the module. The circuit components shown in FIG. 1H are used to convert the higher voltage signals from the motor controller into a voltage suitable for the microcontroller in FIG. 1D. The circuit components of FIG. 1H perform this conversion on a per signal basis to protect the microcontroller from the higher signal voltage that the controller supplies. The circuit components shown in FIG. 1J generate an analogue signal between 0 and 3.3V that is directly proportional to the current desk height. The microcontroller is able to read the digital height data that is sent from the motor controller and, convert this into the analogue voltage using a digital-to-analogue converter which is embedded in the microcontroller in FIG. 1D. This part of the circuit provides a unity gain stable buffer.

The circuit components shown in FIG. 1K are a non-volatile flash memory device which is used by the microcontroller to store the module configuration parameters between power cycles. The circuit component shown in FIG. 1L is the microcontroller programming connector, This is used to download the operating firmware to the microcontroller in the factory. The circuit components shown in FIG. 1M are a linear regulating power supply that converts the motor controller 5V, direct current down to 3.3V, direct current suitable for the microcontroller. The circuit components of FIG. 1M thereby generate a power source for the microcontroller. This generated power source can provide enough current to power the microcontroller and all the associated circuitry in the system. FIG. 1N shows a push button which can be used by the user to reset the module sensing algorithms as required. The components in FIG. 1P provide an audio indication to the user that either a collision or a proximity detection event has occurred, similar to the visual indicator previously described. In some embodiments of the system, the audio indicator may provide warning to the user of a collision or imminent collision, and the system may not stop the motors, instead relying on the audio indicator's warning to allow the user to decide whether to continue operating the height-adjustability function of the desk, and thereby manually over-riding the automatic stopping function of the system. Finally, FIG. 1R is the main electrical interface between the system for reducing injury from pinch zones in adjustable height work surface assemblies, the adjustment switch and the main controller.

The following table gives a description of each component identified in the circuit diagrams shown in FIGS. 1A-1R:

| Designator | Manufacturer | Description |
|---|---|---|
| C2, C3, C4, C6, C7, C8, C11, C14, C16, C17, C18, C19, C22, C27, C28, C29, C33, C34, C35, C36, C37, C39, C41 | Kemet | Cap 0402 100 nF 10% 16 V C0402C104K4RACTU |
| C23 | Kemet | Cap 0402 10 uF 20% 6.3 V C0402C106M9PACTU |
| C5, C21, C40 | AVX | Cap 0805 4.7 uF 10% 16 V 0805YC475KAT2A |
| C1 | Panasonic | Cap eev_K16 4700 uF 20% 16 V EEVFK1C472M |
| C42, C43, C44 | Kemet | Cap 0805 220 nF 5% 100 V C0805C224J1RACTU |
| C20, C30 | Kemet (NoParam) | Cap 0805 1 uF 10% 50 V C0805C105K5RACTU |
| C15 | Kemet | Cap 0402 1 uF 10% 16 V C0402C105K4PAC7411 |
| SK3 | Hirose | Connector; USBMicro-B, Reverse type; SMT; 5 Position; Right Angle |
| IC16 | Silicon Labs | Single-Chip USB to UART Bridge, 1024 Bytes EEPROM, −40 to 85 deg C., 28-pin QFN, Tube |
| FB1 | Murata | Chip Ferrite Bead for Power Lines, 330 Ohm, 1500 mA, −55 to 125 deg C., 2 × 1.25 × 1.05 mm SMD, Tape and Reel |
| C25, C26, C31, C32 | Kemet | CAP 33 pF 16 V ± 10% 0805 (2012 Metric) Thickness 1 mm SMD |
| J3, J4, J5, J6, J7, J8 | Molex | Con 8-way MiniFit JR 39-30-1080 |
| J1, J2 | CUI Inc | Con 7-way DIN SDS-70J |
| J13 | CNC Tech | Con 10-way Header 1.27 mm 3220-10-0300-00 |
| J14 | Molex | Con 6-way Nano-Fit 105314-1106 |
| J9, J10, J11, J12 | Zhejiang Deli | Con 2-way ZJD AW8 HY-2AWB |
| D17, D18 | Avago | Diode 0805 HSMC-C280 |
| D2, D3, D4, D5, D6, D7, D8, D9, D10, D11, D12, D13, D14, D16, D19, D20 | AVX | Diode 0402 5 V GG040205100N2P |
| D1 | Microsemi | Diode DO-214BA 15 V 1 A LSM115JE3 |
| D15 | Nexperia | Diode SOT143B 5.5 V PRTR5V0U2X |
| L1, L2, L3, L4 | Abracon LLC | Inductor 0805 0.9mR 0.005 A AIML-0805-180K-T |
| IC12, IC15, IC17 | Allegro Microsystems | Allegro Microsystems Hall-Effect Current ACS723LLCTR-10AB-T soic_8 |
| IC18 | TI | TI Capacitive Touch FDC2114 qfn_16 |
| IC9 | Adesto Technologies | Adesto Technologies Flash AT25SF161-SSHD sop_8 |
| IC3 | Atmel | Atmel ARM ATSAMD21J18A-A qln_64 |
| IC1, IC6 | TI | TI Quad buffer SN74LV125APWR tssop16 |
| IC5, IC7, IC8 | TI | TI Buffer SN74LVC1G126 sot-23-5 |
| U1 | Analog | Analog Operation Amplifier AD8613AUJZ sot-23-5 |
| IC2 | TI | TI Quad NAND SN74LVC00APWR tssop16 |
| IC19 | STMicro | STMicro Voltage Regulator LD1117DTTR dpak_3 |
| B1 | Soberton | Electromagnetic Buzzer, 3.1 kHz, 83 dBA |
| R31, R32 | Vishay | Res 0402 274R 1% CRCW0402274RFKED |
| R34 | Vishay | Res 0402 487R 1% CRCW0402487RFKED |
| R16, R19, R21 | Vishay | Res 0402 511R 1% CRCW0402511RFKED |
| R18, R20, R23, R50 | Vishay | Res 0402 1K00 1% CRCW04021K00FKED |
| R12, R13, R15, R17, R22, R24, R25, R26, R28, R29, R37, R38, R39, R40, R41, R51, R52, R68 | Vishay | Res 0402 4K64 1% CRCW04024K64FKED |
| R2, R3, R4, R5, R6, R7, R8, R9, R49 | Vishay | Res 0402 10K0 1% CRCW040210K0FKED |
| R14, R47 | Vishay | Res 0805 51R1 1% CRCW080551R1FKED |
| R35 | Vishay | Res 0805 1K00 1% CRCW08051K00FKED |
| R1, R11, R46, R48, R58, R62, R66 | Vishay | Res 0805 0R —% CRCW08050000Z0EA |
| R27 | Vishay | Res 0805 120R 1% CRCW0805120RFKEA |
| R30 | Vishay | Res 0805 200R 1% CRCW0805200RFKEA |
| SW1 | TE Connectivity | TE Connectivity FSM4JSMATR SMT |
| TR1 | Vishay Siliconix | MOSFET, N-CH, 30 V, 1.2 A, SOT-563 |

Figure 2A:
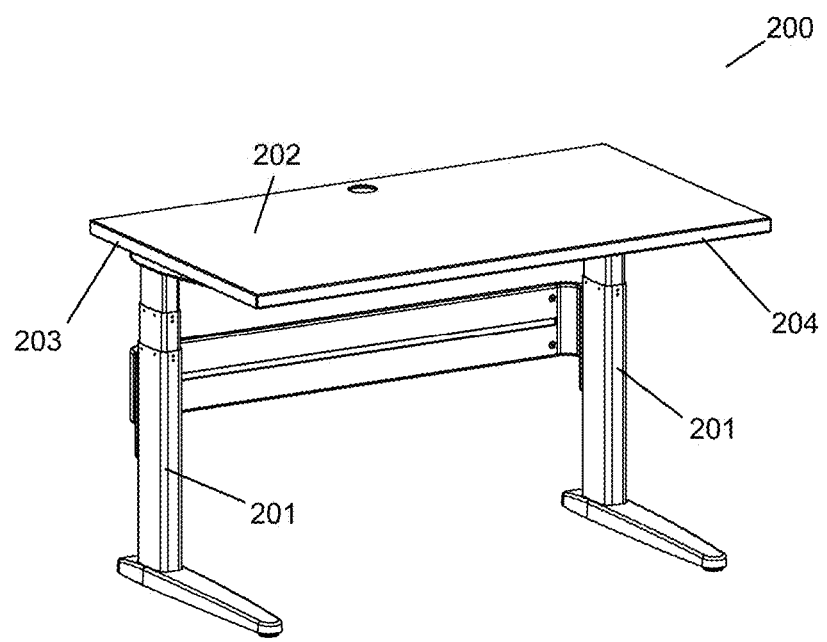
FIG. 2a shows a two-leg embodiment of a height adjustable desk and illustrates placement of the system for reducing injury from pinch zones in adjustable height work surface assemblies.
Figure 2B:
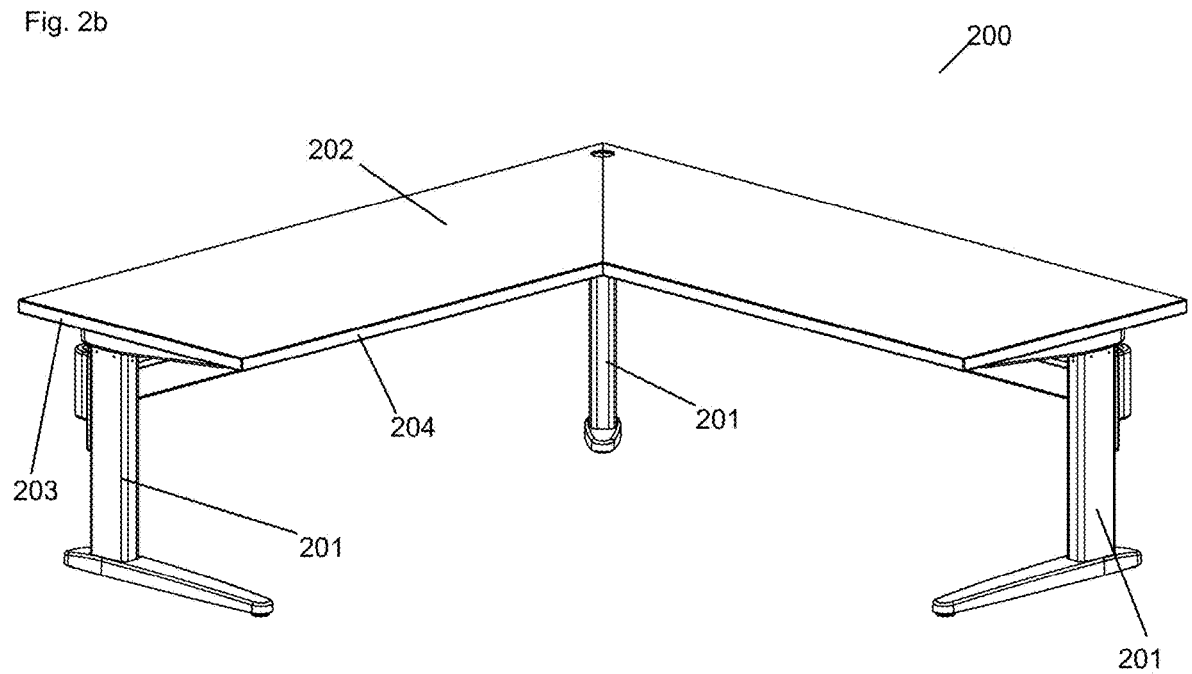
FIG. 2b shows a three-leg embodiment of a height adjustable desk and illustrates placement of the system for reducing injury from pinch zones in adjustable height work surface assemblies.

FIGS. 2a and 2b show height adjustable desks and illustrates placement of the system for reducing injury from pinch zones in adjustable height work surface assemblies. FIG. 2a shows an embodiment of a height adjustable desk with two legs, while FIG. 2b shows an embodiment of a height adjustable desk with three legs. Like numerals will be used to identify like features common to both FIGS. 2a and 2b. Thus, FIGS. 2a and 2b show the height adjustable desk assembly 200 with height adjustable legs 201 and desktop surface 202. Also shown is the edge 203 of desktop surface 202. Embodiments of the present system may be disposed on the edge 203 or they may be disposed on the underside of the desktop surface 202 adjacent to the edge 203. In some embodiments, the present system will not be provided at the front edge 204 of the desktop surface 202, while in other embodiments, the system will be provided at edge 204. The present system may be provided at all edges of the desktop surface 202 or only at selected edges, depending on the needs of the user.

Figure 3:
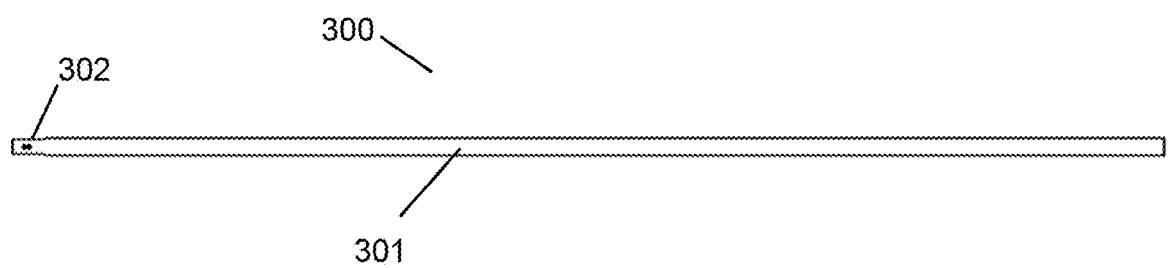
FIG. 3 is a top view of a sensor strip for the system for reducing injury from pinch zones in adjustable height work surface assemblies.
Figure 4:
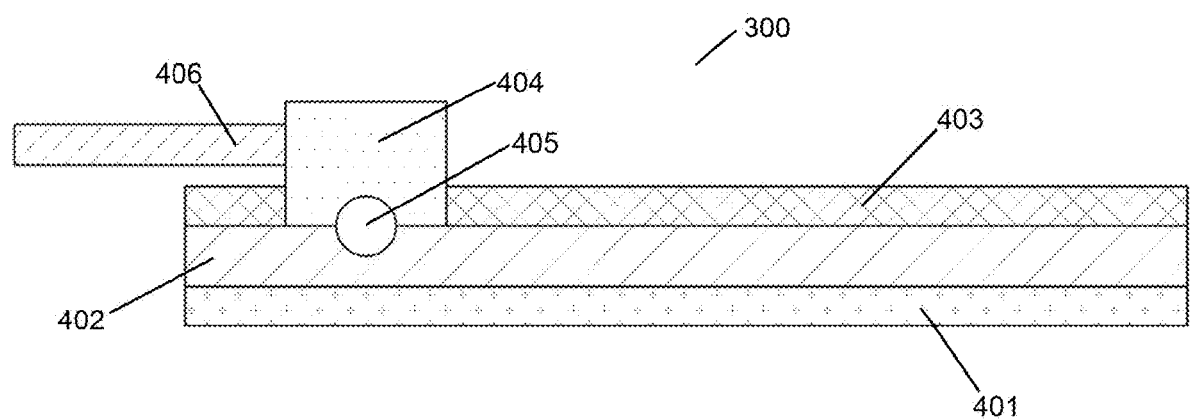
FIG. 4 is a cross-sectional view of the sensor strip for the system for reducing injury from pinch zones in adjustable height work surface assemblies.

FIGS. 3 and 4 show an embodiment for a sensor strip for the system for reducing injury from pinch zones in adjustable height work surface assemblies. FIG. 3 shows a top view of the sensor strip 300, and FIG. 4 shows a cross-sectional view of the sensor strip 300. As can be seen in FIG. 3, the sensor strip 300 has a long, narrow body 301 with a connector 302 disposed at one end thereof. By way of example, and without limitation, the sensor strip 300 may be 800 mm long and 12 mm wide. One of ordinary skill in the art will readily appreciate that the dimensions of the sensor strip may vary depending on the user's particular application. For example, sensor strips both longer and shorter than the dimensions recited above may be necessary to fit a user's desk. The sensor strip may be attached the desk by any means known in the art, including adhesive or mechanical fasteners.

FIG. 4 shows a cross-sectional view of the sensor strip 300. The bottom layer 401 of the sensor strip 300 consists of an FR4 substrate. This bottom layer 401 is a flexible, insulating layer that forms the base of the sensor strip 300. Disposed on top of the bottom layer 401 is the conducting layer 402. The conducting layer 402 performs the sensing function of the strip, it conducts the electrical signals produced by the circuit described above, which are effected by the proximity of obstructions and thereby sensed by the above-described circuit. The conducting layer 402 may be made of any acceptable conducting material, including by way of example and without limitation, copper, aluminum or gold. A connector 404 is electrically connected by solder 405 to the conducting layer 402. A wire 406, electrically connected to the connector 404, joins the sensor strip 300 to the circuit described in FIG. 1A-R. The topmost layer of the sensor strip 300 is the solder resist 403. The solder resist 403 covers and insulates the conducting layer 402. An aperture in the solder resist 403 allows the connector 404 to be soldered to the conducting later 402. It should be appreciated that the sensor strip 300 is very low profile, so as not to obstruct the user's movement around a desk. Moreover, the sensor strip 300 is flexible, to allow it to conform to a variety desk underside surfaces. Additionally, the sensor strip is fabricated such that it can be cut to the required length. It should be appreciated that different sensor materials, other than what has been described with respect to FIGS. 3 and 4 can be used. Several suitable materials have been identified for the sensor material, including aluminum sheets, copper tape, solid copper wire, braided copper wire, and aluminum tape. Conductive, flexible plastic sheets coated with indium tin oxide were also found to be an acceptable sensor material. All of these materials could be used as the sensor strip in place of the sensor described in FIGS. 3 and 4.

Figure 5:
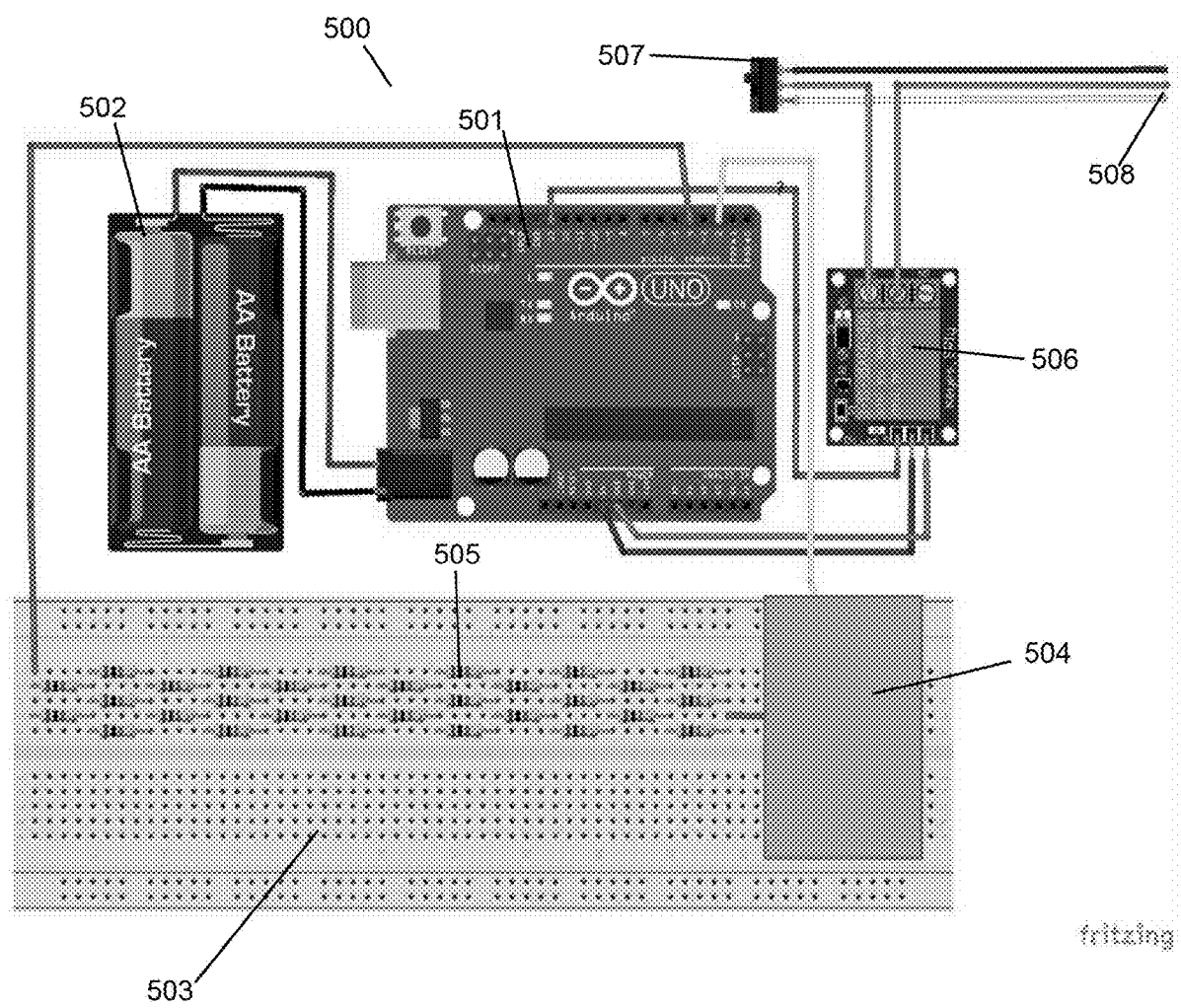
FIG. 5 is a circuit diagram of a second embodiment for the system for reducing injury from pinch zones in adjustable height work surface assemblies.

FIG. 5 is a circuit diagram of an alternate embodiment for the system for reducing injury from pinch zones in adjustable height work surface assemblies. The circuit 500 for the system consists of three major parts. The first part is the microcontroller 501 and battery pack 502. The microcontroller 501 may be an Arduino Uno R3 microcontroller board. Battery pack 502 may be provided to provide the required operating voltage for the microcontroller 501. One of ordinary skill in the art will appreciate that any power supply that meets the power input requirements of microcontroller 501 could be used, inclusive of batteries or standard electrical mains power either transformed into a suitable voltage or untransformed. Additionally, the microcontroller may also be powered by the same power source that operates the adjustable height legs.

Also shown in FIG. 5 is the sensor circuit 503, which consists of sensor 504 and sensor circuit resistors 505. Sensor circuit resistors 505 may consisting of 30 MΩ of resistance, and may be provided in any form known in the art. The amount of resistance chosen for the sensor circuit resistors 505 effects the performance of the overall system. Different resistance values from 1 MΩ to 40 MΩ may be used and the amount needed varies based upon the amount of sensitivity desired and the amount of sensor material used. Generally, the higher the resistance of sensor circuit resistors 105, the higher the sensitivity of the system. However, if higher resistance values are used for sensor circuit resistors 505, this slows down the detection circuit so to maintain a real-time reaction the speed and sensitivity must be balanced.

Also part of the sensor circuit 503 is the sensor 504. This is the material that senses the conductive object in its proximity and or responds to being touched by the user. It must be conductive and it must be capable of having an electrical connection made to it, either via soldering or a physical connector. It also must have sufficient surface area to detect the proximity of an obstruction in the path of the desktop. Several suitable materials have been identified for the sensor material, including aluminum sheets, copper tape, solid copper wire, braided copper wire, and aluminum tape. Conductive, flexible plastic sheets coated with indium tin oxide were also found to be an acceptable sensor material. As an example, and without limitation, aluminum tape may be used for the sensor material. The aluminum tape was applied in a continuous run of 138" or 3.5 meters long, thereby applying the sensor to the perimeter of the desk except for the front edge and was found to function acceptably as the sensor. The sensor may have an adhesive on one side or it may be attached to the desk with mechanical connections.

Also shown in FIG. 5 is the relay 506. The relay 506 may be a 5V relay and is controlled by microcontroller 501. The relay 506 interrupts the signal from control switch 507 to the input 508 of the adjustable height lea, upon receiving a signal from the microcontroller that the sensor has detected an obstruction in the path of the desktop. It should be appreciated that the relay will interrupt signals from any height adjustable leg system that the user implements on a desk. Thus, connections on the housing for the detection system may be provided that accommodate different manufacturers' connection schemes, including by way of example and without limitation, 7-pin serial connectors and RJ45 jacks.

The microcontroller 501 is programmed with code to perform the calculations necessary to complete the sensing functions. It was determined that there are several parameters in the code that allow the system to function correctly. The basic program simply measures the time it takes to complete the sensor circuit in milliseconds. If the value was greater than a defined value an obstruction was detected. To address the highly variable sensor data, a moving average with a parameter for sample size may be employed. This takes 10-1000 sensor readings and averages them together to smooth out the spikes in the sensor data. This parameter presents a trade-off between speed and sensitivity. A low sample size of 10 preserves speed of calculation but allows variability in the sensor data. Higher values like 1000 slow down the data to about 1 reading a second and produces almost completely uniform data that is highly resistant to change. Additionally, the program implements a 1 second delay after the relay trips to prevent the relay from tripping on and off and making it was difficult to determine what stimuli had caused the relay to trip.

Another problem that the programming addresses is that variability of installation types that are encountered in the field. The present system will be installed in a wide variety of different environments and the sensor values could be in range of 250±20 or 15,000±1,000 just based upon the office environment. Setting a static threshold value for triggering the relay will not work in such a variable environment. Therefore, the trigger threshold is set to be a percentage of the sensor value to accommodate low and high baseline sensor readings. The program takes a sensor reading computed from the running average of 25 readings, it divides by 100 to get a number equal to 1% of the sensor reading. Then this number is multiplied by 15 to get 15% of the sensor reading this is then added to the sensor value. Next the program compares the next sensor value to determine if it is larger than the previous sensor value+15% if it is, the relay is tripped then waits one second and starts over. If not, it stores the current value as the previous value and starts over.

Other additional problems are solved by the programming. Occasionally, electromagnetic interference from other sources will cause the sensor values to be greatly reduced, which causes associated calculations to fail. To solve this problem a parameter arbitrarily adds 1000 to all of the sensor values to prevent the calculations from failing. Additionally, to solve the problem of the relay triggering on startup because the program uses the previous value of 0 in the calculations, an arbitrary high value of 5000 is set as the first 'previous value' before it is replaced with the sensor value from the first cycle of the program at the end of the first cycle.

It will be appreciated by those of ordinary skill in the art that, while the forgoing disclosure has been set forth in connection with particular embodiments and examples, the disclosure is not intended to be necessarily so limited, and that numerous other embodiments, examples, uses, modifications and departures from the embodiments, examples and uses described herein are intended to be encompassed by the claims attached hereto. Various features of the disclosure are set forth in the following claims.

The invention claimed is:

1. An assembly comprising:
   a desk surface;
   at least one adjustable-height leg, said adjustable height leg having an outer shell, a top casting for engagement with the desk surface and an actuator with a motor disposed within the outer shell for adjusting the height of the leg;
   a controller electrically connected to the at least one adjustable-height leg, said controller having an adjustment switch for receiving a user input to raise or lower the adjustable-height leg, said controller further having a system for preventing pinch injuries during the operation of the adjustable height leg, said system comprising:
   a Hall-effect sensor in electrical connection with an electrical input terminal of the motor, said Hall-effect sensor providing a signal to the system corresponding to a current draw of the motor and wherein the system is configured to disable the motor if the current draw of the motor exceeds a fixed set point;
   a proximity detection sensor connected to the system, wherein said proximity detection sensor is a strip of conducting material disposed adjacent to a perimeter of the desk surface and in electrical connection with an LC tank circuit, said LC tank circuit in electrical connection with the controller, wherein said LC tank circuit is configured to exhibit a change in state when an object is in close proximity to the strip of conducting material and wherein the system is configured to disable the motor when the LC tank circuit exhibits the change in state, and
   wherein pinch injuries are prevented by disabling the motor notwithstanding motor activation input from a user.

2. The assembly of claim 1, wherein the system for preventing pinch injuries is powered by electrical power from the controller.

3. The assembly of claim 1, wherein the at least one adjustable-height leg is provided with a foot casting and is free-standing.

4. The assembly of claim 1, wherein three adjustable-height legs are included in the assembly.

5. The assembly of claim 1, wherein the change in state of the LC tank circuit is a change in capacitance.

6. The assembly of claim 1, wherein the change in state of the LC tank circuit is a change in frequency.

7. The assembly of claim 1, the LC tank circuit's frequency changes when the proximity detection sensor is disconnected and the controller disables the motor in response to this frequency change.

8. The assembly of claim 1, wherein the proximity detection sensor is formed from a material selected from the group comprising aluminum sheets, copper tape, solid copper wire, braided copper wire, aluminum tape and plastic sheets coated with indium tin oxide.

9. The assembly of claim 1, wherein the system further comprises a visual indicator that alerts the user that a collision or a proximity detection event has occurred or may imminently occur.

10. The assembly of claim 1, wherein the system further comprises a audio indicator that alerts the user that a collision or a proximity detection event has occurred or may imminently occur.

11. The assembly of claim 1, wherein the proximity detection sensor has a long, narrow body with a connector disposed at one end thereof.

12. The assembly of claim 11, wherein the proximity detection sensor is 800 mm long and 12 mm wide.

13. The assembly of claim 1, wherein the proximity detection sensor is comprised of layers including an FR4 substrate, a conducting layer and a solder resist layer.

14. The assembly of claim 13, wherein the conducting layer is selected from the group comprising copper, aluminum and gold.

15. The assembly of claim 13, wherein a connector is electrically connected by solder to the conducting layer in the proximity detection sensor.

16. The assembly of claim 15, wherein a wire electrically connects the connector to the controller.

17. The assembly of claim 13, wherein an aperture in the solder resist allows the connector to be soldered to the conducting layer.

18. The assembly of claim 1, wherein the proximity detection sensor is provided at all edges of the desk surface.

19. The assembly of claim 1, wherein the proximity detection sensor is provided at selected edges of the desk surface.

20. The assembly of claim 1, wherein the system for preventing pinch injuries is battery powered.

\* \* \* \* \*